US006958133B2

United States Patent
Hammer et al.

(10) Patent No.: US 6,958,133 B2
(45) Date of Patent: Oct. 25, 2005

(54) FLUE GAS DESULFURIZATION PROCESS AND APPARATUS FOR REMOVING NITROGEN OXIDES

(75) Inventors: Michael T. Hammer, Birdsboro, PA (US); Michael L. Mengel, Fredericksburg, PA (US)

(73) Assignee: Marsulex Environmental Technologies, Corp., Lebanon, PA (US)

( * ) Notice: Subject to any disclaimer, the term of this patent is extended or adjusted under 35 U.S.C. 154(b) by 0 days.

(21) Appl. No.: 10/709,453

(22) Filed: May 6, 2004

(65) Prior Publication Data

US 2004/0197241 A1 Oct. 7, 2004

Related U.S. Application Data

(62) Division of application No. 10/064,055, filed on Jun. 5, 2002, now Pat. No. 6,759,022.

(51) Int. Cl.[7] .......................... B32B 27/02; C01B 21/00
(52) U.S. Cl. ...................... 422/171; 423/235; 423/396; 423/397
(58) Field of Search .................. 422/177; 423/235, 423/396, 397

Primary Examiner—Glenn Caldarola
Assistant Examiner—Tom Duong
(74) Attorney, Agent, or Firm—Gary M. Hartman; Domenica N.S. Hartman; Hartman & Hartman

(57) ABSTRACT

An apparatus and process for removing acidic gases and NOx from flue gases produced by utility and industrial plants. The process and apparatus convert NOx, and particularly nitric oxide, to nitrogen dioxide, which is then reacted to form a valuable byproduct. The process generally entails contacting a flue gas with a scrubbing medium to absorb acidic gases from flue gas and produce an intermediate flue gas. The intermediate flue gas is then cooled to cause nitric oxide present therein to be oxidized to form nitrogen dioxide, which is then absorbed from the flue gases to produce a nitrogen dioxide-containing solution and a scrubbed flue gas. The nitrogen dioxide in the nitrogen dioxide-containing solution is then reacted with ammonium hydroxide to form ammonium nitrate as a valuable byproduct.

14 Claims, 1 Drawing Sheet

FLUE GAS DESULFURIZATION PROCESS AND APPARATUS FOR REMOVING NITROGEN OXIDES

This application is a division of U.S. application Ser. No. 10/064,055 filed on Jun. 5, 2002, now U.S. Pat. No. 6,759,022.

BACKGROUND OF INVENTION

1. Field of the Invention

This invention generally relates to gas-liquid contactors used in the removal of acidic gases, such as from utility and industrial flue gases. More particularly, this invention is directed to a wet flue gas desulfurization (FGD) process and apparatus that remove nitrogen oxides (NOx) from a flue gas following the removal of acidic gases such as sulfur dioxide.

2. Description of the Related Art

Acidic gases, including sulfur dioxide ($SO_2$), hydrogen chloride (HCl) and hydrogen fluoride (HF), are known to be hazardous to the environment, and as a result their emission into the atmosphere is closely regulated by clean air statutes. For the removal of acidic gases from flue gases produced by utility and industrial plants, gas-liquid contactors and absorbers, or scrubbers, are widely employed. Scrubbers generally employ a liquid media that is brought into intimate contact with a flue gas to remove acidic gases by absorption. The process by which acidic gases are removed from flue gases in this manner is generally referred to as wet flue gas desulfurization (wet FGD).

The cleansing action produced by scrubbers is generally derived from the passage of a flue gas through a tower cocurrently or countercurrently to a descending liquid medium. Calcium-based slurries, sodium-based solutions and ammonia-based solutions are typical alkaline scrubbing media used in flue gas scrubbing operations. The cleansed gases are allowed to exit the tower, typically passing through a mist eliminator to atmosphere. The liquid medium and its absorbed gases are collected in a tank, typically at the bottom of the tower, where the absorbed gases are reacted to form byproducts that are useful or at least not harmful to the environment. While scrubbers utilizing calcium-based slurries generally perform satisfactorily, their operation results in the production of large quantities of wastes or gypsum, the latter having only nominal commercial value. In contrast, ammonia-based scrubbing processes have been used in the art to produce a more valuable ammonium sulfate fertilizer, as taught by U.S. Pat. Nos. 4,690,807 and 5,362,458, each of which are assigned to the assignee of the present invention. In these processes, the scrubbing solution is accumulated in a tank where the absorbed sulfur dioxide reacts with ammonia ($NH_3$) to form ammonium sulfite (($NH_4$)$_2SO_3$) and ammonium bisulfite ($NH_4HSO_3$), which are oxidized in the presence of sufficient oxygen to form ammonium sulfate (($NH_4$)$_2SO_4$) and ammonium bisulfate ($NH_4HSO_4$), the latter of which reacts with ammonia to form additional ammonium sulfate. A portion of the ammonium sulfate solution and/or ammonium sulfate crystals that form in the solution can then be drawn off to yield the desired byproduct of this reaction.

Nitrogen oxides (NOx), which include nitric oxide (NO) and nitrogen dioxide ($NO_2$), are also commonly found in flue gases produced by utility and industrial plants. The presence of NOx in the effluent of a scrubber is environmentally undesirable because of links to smog and ozone deterioration. Because nitric oxide readily oxidizes at room temperature (about 20° C. to about 25° C.) to form nitrogen dioxide, nitric oxide present in flue gases tends to form nitrogen dioxide which, depending on atmospheric conditions, can produce an unsightly yellow-brown plume. The elimination of NOx from flue gases has typically focused on the avoidance of forming nitrogen dioxide. For example, nitrogen gas ($N_2$) is produced in processes involving NOx dissociation by selective catalytic reduction (SCR) or selective non-catalytic reduction (SNCR). As the primary component of air, the release of nitrogen gas into the atmosphere does not pose an environmental concern. However, an ongoing demand of desulfurization processes is the reduction of emissions. From an economics standpoint, it is also desirable for a desulfurization process to produce valuable byproducts. Electron beam and low NOx burners have also been proposed as methods for removing Nox. For example, irradiation with an electron beam has been used to convert NOx to ammonium nitrate ($NH_4NO_3$) in the presence of ammonia, as disclosed in U.S. Pat. Nos. 5,834,722 and 6,179,968. However, disadvantages of ion beam treatments include their relatively high cost and low efficiency.

SUMMARY OF INVENTION

The present invention provides an apparatus and process for removing acidic gases and NOx from flue gases produced by fuel combustion operations of the type carried out in utility and industrial plants. The process and apparatus of this invention intentionally convert NOx, and particularly nitric oxide, to nitrogen dioxide, which is then reacted to form a valuable byproduct. As such, the process and apparatus of this invention differs from prior processes in which the object was to convert NOx to nitrogen gas, which is then released into the atmosphere.

The process of this invention generally entails contacting a flue gas with a scrubbing medium, preferably an ammonium sulfate-containing scrubbing solution, to absorb acidic gases from the flue gas and produce an acidic gas-containing solution and an intermediate flue gas. According to the invention, after contact with the scrubbing medium, the intermediate flue gas is cooled to cause nitric oxide to be oxidized to form nitrogen dioxide, which is then absorbed from the intermediate flue gas to produce a $NO_2$-containing solution and a more fully scrubbed flue gas. The nitrogen dioxide in the $NO_2$-containing solution is then reacted with an aqueous ammonia solution to form ammonium nitrate ($NH_4NO_3$) as the valuable byproduct of the process. A flue gas scrubbing apparatus suitable for use with this invention comprises means for contacting the flue gas with the scrubbing medium to remove acidic gases and produce the intermediate flue gas, means for reducing the temperature of the intermediate flue gas to convert nitric oxide present in the intermediate flue gas to nitrogen dioxide, means for absorbing nitrogen dioxide from the intermediate flue gas to produce the $NO_2$-containing solution and a scrubbed flue gas, and means for reacting the nitrogen dioxide in the $NO_2$-containing solution with aqueous ammonia solution to produce ammonium nitrate.

According to the above, NOx present in a flue gas is intentionally converted to nitrogen dioxide, which is the species typically avoided in prior art processes because of environmental concerns and the visible plume produced by nitrogen dioxide. However, the present invention uses a combination of oxidation of nitric oxide to nitrogen dioxide, followed by a controlled reaction with an aqueous ammonia solution, the result of which does not reduce NOx to nitrogen gas but instead captures NOx to produce a valuable byproduct.

Other objects and advantages of this invention will be better appreciated from the following detailed description.

BRIEF DESCRIPTION OF DRAWINGS

The present invention will now be described, by way of example, with reference to FIG. 1, which is a schematic representation of a flue gas scrubbing apparatus configured in accordance with the present invention.

DETAILED DESCRIPTION

Figure 1:
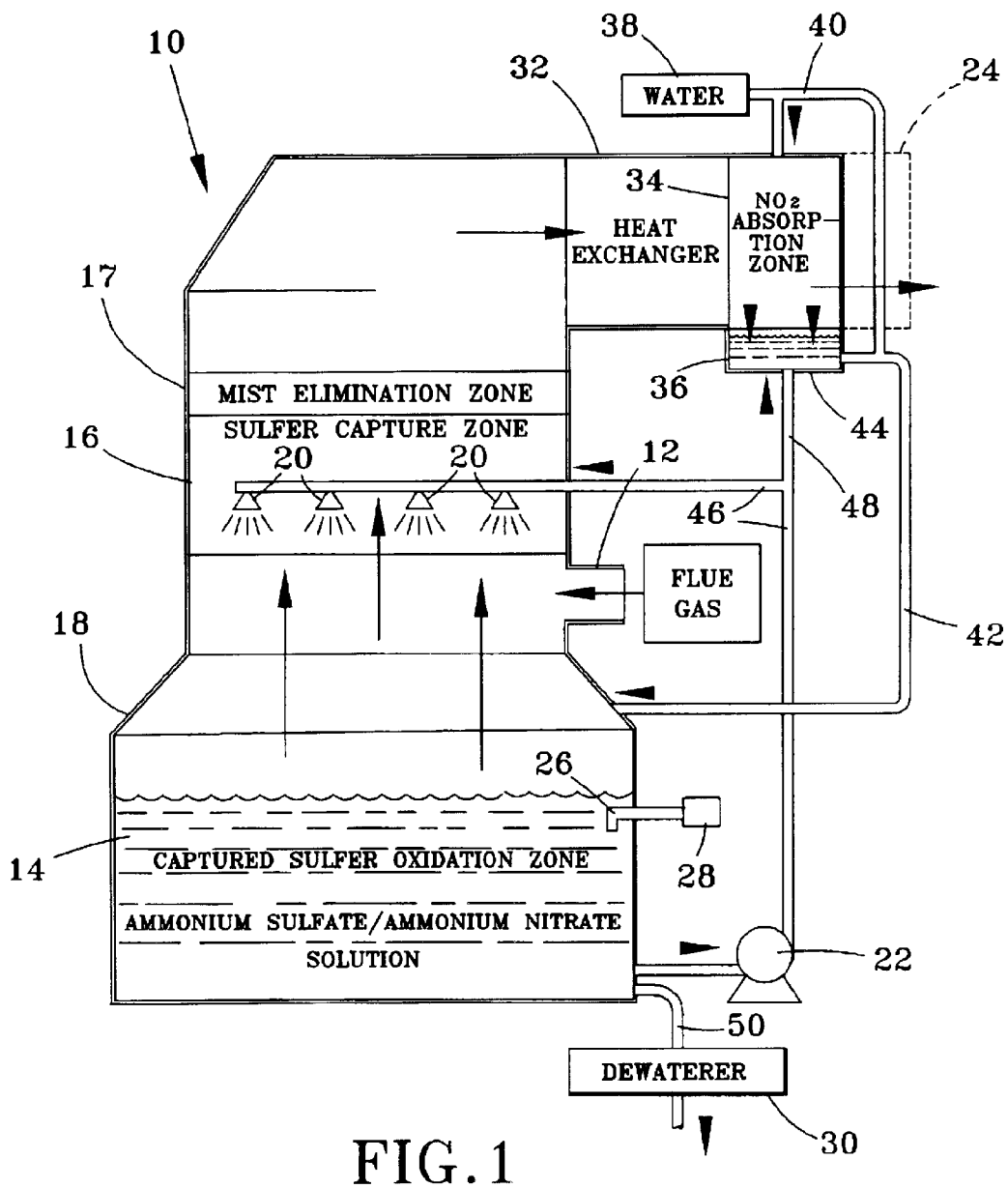

FIG. 1 schematically illustrates a flue gas scrubbing apparatus 10 that has been modified in accordance with the teachings of this invention. The scrubber 10 is generally of the type that scrubs flue gases produced by the burning of fossil fuels or another process that results in the flue gas containing acidic gases, such as sulfur dioxide, hydrogen chloride and/or hydrogen fluoride, as well as particulate matter and, of interest to the present invention, nitrogen oxides (NOx).

The conventional components of the scrubber 10 include a contact region 16 in which an alkaline contact medium, referred to as a scrubbing slurry or solution 14, is brought into contact with a flue gas that enters the scrubber 10 through an inlet duct 12. The solution 14 is shown as being delivered with a pump 22 through a pipe 46 to the contact region 16, where the solution 14 is dispersed with spray nozzles 20 or another suitable delivery device. After being scrubbed by the solution 14, the flue gas flows up through a demister 17, and is eventually released to atmosphere through a chimney 24 or other suitable structure. As with many existing wet flue gas desulfurization facilities, the scrubber 10 is equipped for in situ forced oxidation of the solution 14 that has collected in a tank 18 below the contact region 16. In FIG. 1, an oxygen-containing gas (e.g., air) is represented as being introduced into the tank 18 with a sparger 26 connected to a suitable source 28. In this manner, the reaction product of contacting the acidic gases of the flue gas with the solution 14 is oxidized, which in the present invention preferably yields a useful fertilizer byproduct. A particular example is ammonia-based scrubbing processes taught by commonly-assigned U.S. Pat. Nos. 4,690,807 and 5,362,458. In these processes, acidic gases present in a flue gas are absorbed by an ammonium sulfate solution 14, which collects in the tank 18 where aqueous ammonia (ammonium hydroxide, $NH_4OH$) or another source of ammonia is introduced, such as with the sparger 26. The absorbed sulfur dioxide reacts with the ammonia to form ammonium sulfite ($(NH_4)_2SO_3$ and ammonium bisulfite ($NHHSO_3$), which are then oxidized in the presence of sufficient oxygen (introduced by the sparger 26) to form precipitates of ammonium sulfate and ammonium bisulfate ($NH_4HSO_4$). Ammonium bisulfate undergoes a second reaction with ammonia to form additional ammonium sulfate precipitate. A portion of the ammonium sulfate solution 14 is then removed through a pipe 50 and dewatered with a suitable dewatering device 30 to precipitate ammonium sulfate, which can then be sold as a valuable fertilizer. If hydrogen chloride and hydrogen fluoride were present in the flue gas, as is typically the case with flue gas produced by the combustion of coal, these acidic gases are also captured to form ammonium chloride and ammonium fluoride, which can be removed in the same manner. Further details regarding the desulfurization of flue gases can be obtained in the prior art, including the above-noted U.S. Pat. Nos. 4,690,807 and 5,362,458, and therefore will not be discussed in any further detail here.

In addition to the above, the scrubber 10 of this invention removes NOx from the scrubbed flue gas emerging from the scrubbing process performed in the contact region 16. The flue gas that has passed through the contact region 16 will be referred to here as an "intermediate" flue gas, since it is not the final "scrubbed" flue gas that will be released to atmosphere through the chimney 24. Further processing of the intermediate flue gas occurs in additional zones provided between the demister 17 and the chimney 24 of the scrubber 10. A first of these zones is a heat exchanger 32 or other device capable of reducing the temperature of the intermediate flue gas to something below the auto-oxidation temperature of nitric oxide (NO), which readily oxidizes to form $NO_2$ at or near room temperature. In conventional scrubbers of the type represented in FIG. 1, flue gases exit the contact region 16 at a temperature of typically at least 125° F. (about 50° C.), and often higher, such that the nitrogen dioxide content of the flue gas is relatively low, i.e., the NOx content of flue gases is primarily NO. In a conventional FGD process, oxidation of nitric oxide occurs after the scrubbed flue gases are released to atmosphere. A preferred heat exchanger 32 is capable of reducing the flue gas temperature so that the majority of the nitric oxide content of the intermediate flue gas is converted to nitrogen dioxide, e.g., the flue gas is reduced from a temperature of about 125EF or higher to something near or below room temperature. Various types of heat exchangers known to those skilled in the art are believed to be suitable for use in the scrubber 10 shown in FIG. 1, and therefore the construction of the heat exchanger 32 will not be discussed here in any detail.

After conversion of nitric oxide to nitrogen dioxide within the heat exchanger 32, the intermediate flue gas passes through an absorption zone 34 where nitrogen dioxide is absorbed so that the scrubbed flue gas exiting the chimney 24 is essentially free of nitrogen dioxide. Nitrogen dioxide is more readily absorbed in water and ammonia solutions than is nitric oxide. In a preferred embodiment, the flue gas is contacted with both water (or a water-containing solution) and an ammonia-containing solution, which are introduced into the absorption zone 34 as represented in FIG. 1. Absorption of nitrogen dioxide with water forms nitric acid ($HNO_3$), while absorption of nitrogen dioxide with a ammonia-containing (e.g., ammonium sulfate or hydroxide) solution produces a blend of desirable fertilizers, as discussed below. Water is shown as being delivered from a source 38, while the ammonia-containing solution is represented as being recycled through a pipe 40 from a solution collection tank 44 below the absorption zone 34. The ammonia-containing solution, designated with reference number 36 in FIG. 1, is collected from the absorption zone 34, and therefore is an aqueous ammonia solution containing absorbed nitrogen dioxide. The water and the ammonia-containing solution 36 can be brought into intimate contact with the flue gas within the absorption zone 34 in any suitable manner, such as with spray nozzles or packed column.

The ammonia-containing solution 36 preferably has a pH of less than 7 and contains ammonia slightly above the stoichiometric amount. A suitable and convenient source of the ammonia-containing solution 36 for use in the absorption zone 34 is the ammonium sulfate solution 14 used in the contact region 16 to remove the acidic gases from the flue gas, such that the ammonium hydroxide present in the solution 14 is the source of ammonia in the solution 36. A secondary benefit of using the ammonium sulfate solution 14 is that the absorption zone 34 provides a second opportunity for removing sulfur dioxide and other acidic gases from the flue gas. For the purpose of delivering the solution 14 to the absorption zone 34, the solution collection tank 44 is shown as being coupled by a pipe 48 to the pipe 46 connected to the pump 22. The solution collection tank 44 is also shown as being connected by a pipe 42 through which the ammonia-containing solution 36 can be returned to the tank 18. The final reaction of the process is the conversion of the absorbed nitrogen dioxide in the ammonia-containing solution 36 into a valuable byproduct, ammonium nitrate ($NH_4NO_3$), which occurs according to the following reaction:

$$NO_2 + NH_4OH \rightarrow NH_4NO_3 + H$$

The ammonium nitrate formed or otherwise collected in the tank 18 can be withdrawn and dewatered in the same manner as the ammonium sulfate produced by the absorption of sulfur dioxide.

In view of the above, the present invention can be seen as providing a method and apparatus for capturing nitrogen oxides from a flue gas. Benefits of this invention include the substantial elimination of undesirable NOx emissions from the scrubber 10, producing a useful nitrogen-containing byproduct instead of releasing nitrogen gas to atmosphere, and providing a second opportunity for additional removal of sulfur dioxide, leading to a cleaner scrubbed flue gas released to the atmosphere.

While the invention has been described in terms of a preferred embodiment, it is apparent that other forms could be adopted by one skilled in the art. Accordingly, the scope of the invention is to be limited only by the following claims.

What is claimed is:

1. A flue gas scrubbing apparatus for removing NOx gases from a flue gas, the flue gas scrubbing apparatus comprising:
   means for contacting the flue gas with a scrubbing medium so that the scrubbing medium absorbs acidic gases from the flue gas to produce an acidic gas-containing solution and an intermediate flue gas;
   means for reducing the temperature of the intermediate flue gas to convert nitric oxide to nitrogen dioxide;
   means for absorbing the nitrogen dioxide from the intermediate flue gas to produce a nitrogen dioxide-containing solution and a scrubbed flue gas; and
   means for reacting the nitrogen dioxide in the nitrogen dioxide-containing solution with ammonium hydroxide to produce ammonium nitrate.

2. A flue gas scrubbing apparatus according to claim 1, wherein the absorbing means comprises means for contacting the intermediate flue gas with a water-containing solution so that the water-containing solution absorbs the nitrogen dioxide from the intermediate flue gas to form the nitrogen dioxide-containing solution.

3. A flue gas scrubbing apparatus according to claim 2, wherein the reacting means comprises means for contacting the nitrogen dioxide-containing solution with an ammonia-containing solution containing the ammonium hydroxide.

4. A flue gas scrubbing apparatus according to claim 2, wherein the scrubbing medium is an ammonium sulfate-containing solution containing ammonium hydroxide, and wherein the reacting means comprises means for contacting the nitrogen dioxide-containing solution with the ammonium sulfate-containing solution.

5. A flue gas scrubbing apparatus according to claim 1, wherein the absorbing means comprises means for contacting the intermediate flue gas with an ammonia-containing solution so that the ammonia-containing solution absorbs the nitrogen dioxide from the intermediate flue gas to produce the nitrogen dioxide-containing solution.

6. A flue gas scrubbing apparatus according to claim 1, wherein the scrubbing medium is an ammonium sulfate-containing solution.

7. A flue gas scrubbing apparatus according to claim 6, wherein the absorbing means comprises means for contacting the intermediate flue gas with the ammonium sulfate-containing solution so that the ammonium sulfate-containing solution absorbs the nitrogen dioxide from the intermediate flue gas to produce the nitrogen dioxide-containing solution.

8. A flue gas scrubbing apparatus according to claim 1, further comprising a vessel in which the acidic gas-containing solution is accumulated, and means for introducing ammonia and oxygen into the vessel to react the acidic gases in the acidic gas-containing solution to produce ammonium sulfate.

9. A flue gas scrubbing apparatus according to claim 8, wherein the nitrogen dioxide-containing solution is accumulated in the vessel, where the ammonia introduced into the vessel forms the ammonium hydroxide that reacts with the nitrogen dioxide in the nitrogen dioxide-containing solution to produce ammonium nitrate.

10. A flue gas scrubbing apparatus according to claim 1, further comprising means for releasing the scrubbed flue gas to atmosphere.

11. A flue gas scrubbing apparatus for removing nitric oxide gas and acidic gases from a flue gas, the flue gas scrubbing apparatus comprising:
    means for contacting the flue gas with an ammonium sulfate-containing scrubbing solution so that the scrubbing solution absorbs acidic gases from the flue gas to produce an acidic gas-containing solution and an intermediate flue gas;
    a vessel containing the ammonium sulfate-containing scrubbing solution and in which the acidic gas-containing solution is accumulated;
    means for reducing the temperature of the intermediate flue gas to convert nitric oxide within the intermediate flue gas to nitrogen dioxide;
    means for contacting the intermediate flue gas with a water-containing scrubbing solution so that the water-containing scrubbing solution absorbs the nitrogen dioxide from the intermediate flue gas to produce a nitrogen dioxide-containing solution and a scrubbed flue gas;
    means for releasing the scrubbed flue gas to atmosphere;
    means for accumulating the nitrogen dioxide-containing solution in the vessel containing the ammonium sulfate-containing scrubbing solution; and
    means for introducing ammonia and oxygen into the vessel to react the acidic gases in the acidic gas-containing solution to produce ammonium sulfate and to react the nitrogen dioxide in the nitrogen dioxide-containing solution to produce ammonium nitrate.

12. A flue gas scrubbing apparatus according to claim 11, further comprising means for contacting the intermediate flue gas with the ammonium sulfate-containing scrubbing solution, such that the nitrogen dioxide-containing solution also contains ammonium sulfate.

13. A flue gas scrubbing apparatus according to claim 11, wherein the water-containing scrubbing solution used in the step of contacting the intermediate flue gas comprises the ammonium sulfate-containing scrubbing solution, such that the nitrogen dioxide-containing solution contains ammonium sulfate and water.

14. A flue gas scrubbing apparatus according to claim 11, further comprising means for withdrawing a portion of the ammonium sulfate-containing scrubbing solution from vessel, and means for dewatering the portion of the ammonium sulfate-containing scrubbing solution to precipitate ammonium sulfate and ammonium nitrate.

* * * * *